W. O. HOBBS.
TOY.
APPLICATION FILED AUG. 29, 1921.

1,435,845. Patented Nov. 14, 1922.

W. O. Hobbs Inventor

By Victor J. Evans Attorney

Patented Nov. 14, 1922.

1,435,845

UNITED STATES PATENT OFFICE.

WILLIAM O. HOBBS, OF PARSONS, KANSAS.

TOY.

Application filed August 29, 1921. Serial No. 496,340.

*To all whom it may concern:*

Be it known that I, WILLIAM O. HOBBS, a citizen of the United States, residing at Parsons, in the county of Labette and State of Kansas, have invented new and useful Improvements in Toys, of which the following is a specification.

This invention relates to toys and has for its object the provision of a novel toy including a reversible standard upon which is mounted a rotatable disk, the standard being twisted whereby the disk, upon descending will be caused to rotate and present a pleasing appearance, the disk being furthermore preferably provided with painted pictures indicative of a chase, for instance a picture of a hare and a hound, a cat and a dog, or the like.

An importnt object is the provision of a toy of this character which is so constructed that the disk will rotate initially in one direction and will, upon reaching the center of the standard, be caused to rotate in the opposite direction, the change in direction adding to the interest and amusement to be derived.

An additional object is the provision of a toy of this character which will be simple and inexpensive in manufacture, easy to use, very amusing and entertaining, durable, and a general improvement in the art.

Figure 1:
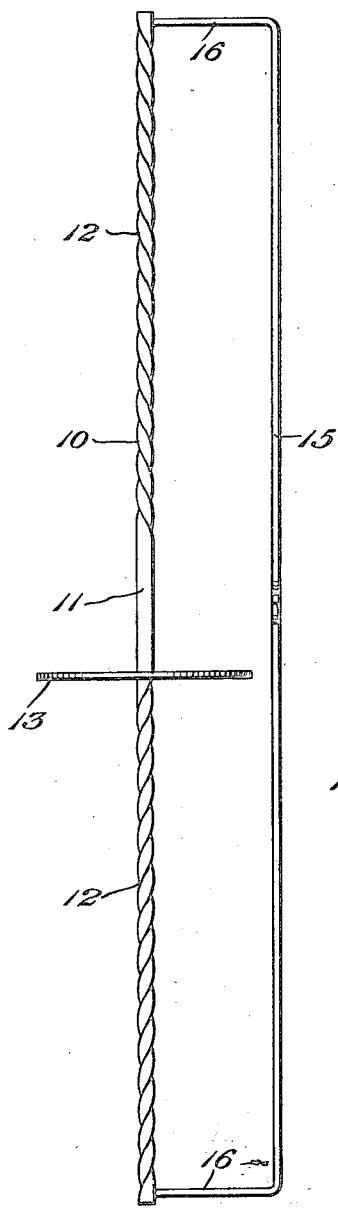
Figure 2:
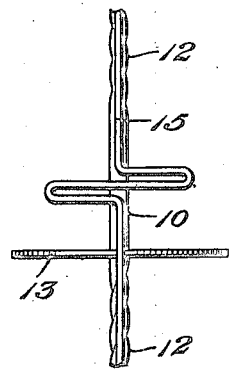
Figure 3:
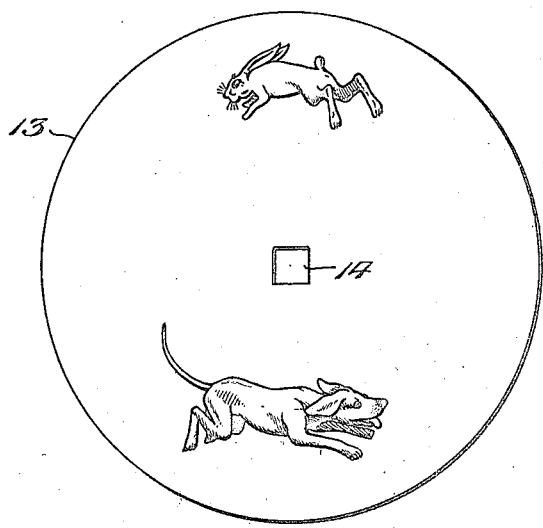

With the above and other objects and advantages in view, the invention consists in the details of construction to be hereinafter more fully described and claimed and illustrated in the accompanying drawings in which, Figure 1 is an elevation of my device, Figure 2 is a cross-sectional view and Figure 3 is a plan view of the disk.

Referring more particularly to the drawings, the numeral 10 designates the support which is formed as a rod angular, preferably square, in cross-section, as shown. The central portion of the rod is formed straight, as shown at 11, while between the center and the ends, the rod is twisted, as clearly indicated at 12, the twist at one end being in the opposite direction to the twist at the other end.

Disposed upon this supporting rod is a disk 13 of suitable material and preferably though not necessarily circular in shape and this disk is formed centrally with a square opening 14 for the passage of the rod. The disk may be ornamented in any preferred manner, though an attractive idea is to provide the disk with pictures, for instance of a rabbit and a hound, a dog and a cat, or any two animals which might naturally be supposed to run one from another.

Extending along one side of the rod and parallel therewith is a handle 15 formed of wire having the ends 16 extended laterally and passed through holes in the ends of the rod. When the disk is in position upon the rod at the upper end thereof, and the rod is held in a downwardly extending direction, the disk will gravitationally descend to the other end of the rod and, owing to the fact that the square opening in the disk conformingly engages the square rod, the disk will be rotated as it slides along the twist of the rod, the rotation of the disk giving the appearance of one animal chasing the other. Upon reaching the central straight portion 12 of the rod, rotation of the disk will cease until the disk slides down into engagement with the other twisted portion, whereupon rotation will be resumed, but in the opposite direction. When the disk has reached the lower end of the rod the rod may be reversed, whereupon the operation will be exactly the same.

From the foregoing description and a study of the drawings, it will be apparent that I have thus provided an extremely simple and yet highly amusing and easily operated novelty toy which requires no skill in its manipulation and which may therefore be used satisfactorily by even the most young. It is to be noted that there are only three parts to the device and that they may be disassembled for convenience in shipping.

While I have shown and described the preferred embodiment of my invention, it is of course to be understood that I reserve the right to make such changes in the form, construction and arrangement of parts as will not depart from the spirit of the invention or the scope of the subjoined claims.

Having thus described the invention, I claim.

1. A toy of the character described comprising a rod having its end portions twisted in opposite directions, a handle extending longitudinally of the rod and having its ends extended laterally and connected with the ends of the rods, and a disk slidable upon and having a central opening conforming in shape to the cross sectional configuration of the rod.

2. A toy of the character described comprising a rod angular in cross-section having its central portion formed straight and its end portions twisted in opposite directions, a hande extending along and parallel with the rod and having its ends laterally extended and passed through the ends of the rod, in combination with a disk slidable upon the rod and having a central opening conforming to the cross sectional configuration of the rod.

In testimony whereof I affix my signature.

WILLIAM O. HOBBS.